(12) United States Patent
Sharma et al.

(10) Patent No.: US 8,364,955 B1
(45) Date of Patent: Jan. 29, 2013

(54) SYSTEMS AND METHODS FOR EFFECTIVELY REMOVING ACCESS TO INDIVIDUAL FILES ON MAGNETIC TAPE MEDIA

(75) Inventors: Mukesh K. Sharma, Maharashtra (IN); Amrish Shah, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 434 days.

(21) Appl. No.: 12/608,144

(22) Filed: Oct. 29, 2009

(51) Int. Cl.
*H04L 29/06* (2006.01)
*H04L 9/00* (2006.01)
*G06F 11/30* (2006.01)

(52) U.S. Cl. ......... 713/165; 713/189; 713/193; 380/277

(58) Field of Classification Search .......... 713/164–167, 713/189, 193; 380/277–286, 22
See application file for complete search history.

(56) References Cited

U.S. PATENT DOCUMENTS

| | | | |
|---|---|---|---|
| 6,134,660 A * | 10/2000 | Boneh et al. .................. | 713/193 |
| 2002/0107877 A1 * | 8/2002 | Whiting et al. ............... | 707/204 |
| 2003/0002665 A1 * | 1/2003 | Sako et al. ..................... | 380/37 |
| 2003/0174605 A1 * | 9/2003 | Sako et al. .................. | 369/47.24 |
| 2004/0133791 A1 * | 7/2004 | Sako et al. ..................... | 713/193 |
| 2005/0013217 A1 * | 1/2005 | Kuroda ....................... | 369/47.14 |
| 2005/0172123 A1 * | 8/2005 | Carpentier et al. ............ | 713/165 |
| 2005/0235103 A1 * | 10/2005 | Saliba et al. .................. | 711/111 |
| 2006/0047894 A1 * | 3/2006 | Okumura ....................... | 711/111 |
| 2006/0067529 A1 * | 3/2006 | Kojima .......................... | 380/201 |
| 2006/0095380 A1 * | 5/2006 | Hsu et al. ......................... | 705/57 |
| 2007/0038857 A1 * | 2/2007 | Gosnell .......................... | 713/165 |
| 2008/0063198 A1 * | 3/2008 | Jaquette et al. ................ | 380/201 |
| 2008/0063206 A1 * | 3/2008 | Karp et al. ..................... | 380/277 |
| 2008/0065881 A1 * | 3/2008 | Dawson et al. ............... | 713/165 |
| 2008/0065906 A1 * | 3/2008 | Itagaki et al. ................. | 713/193 |
| 2008/0165973 A1 * | 7/2008 | Miranda Gavillan et al. ............................ | 380/278 |
| 2008/0168276 A1 * | 7/2008 | Onoda et al. .................. | 713/189 |
| 2009/0049310 A1 * | 2/2009 | Carlson et al. ................ | 713/193 |
| 2009/0049311 A1 * | 2/2009 | Carlson et al. ................ | 713/193 |

OTHER PUBLICATIONS

He, Dinsghan et al. "Design and Implementation of a Network Aware Object-based Tape Device," 2007, IEEE Computer Society, 24th IEEE Conference on Mass Storage Systems and Technologies, pp. 143-156.*
FAQS.ORG, SGI hardware Frequently Asked Questions (FAQ)—Section-42—How can I recover a partially overwritten tar tape?, http://www.faqs.org/faqs/sgi/faq/hardware/section-42.html, as accessed on Aug. 21, 2009.

* cited by examiner

*Primary Examiner* — Darren B Schwartz
(74) *Attorney, Agent, or Firm* — Advantedge Law Group

(57) ABSTRACT

A method for effectively removing access to individual files on magnetic tape media may include: 1) encrypting a file, 2) storing the encrypted file on a tape medium, 3) storing a cryptographic key for accessing the encrypted file within a cryptographic key block located at the end of the tape medium, and then, at a subsequent point in time, 4) removing access to the encrypted file by deleting the cryptographic key for the encrypted file from the cryptographic key block located at the end of the tape medium. Corresponding systems and computer-readable media are also disclosed.

16 Claims, 7 Drawing Sheets

SYSTEMS AND METHODS FOR EFFECTIVELY REMOVING ACCESS TO INDIVIDUAL FILES ON MAGNETIC TAPE MEDIA

BACKGROUND

Magnetic tape media continues to remain a viable alternative to other storage media (such as hard disk drives and optical media), particularly for long-term data storage (such as backups), due to the higher bit density and lower cost per bit typically offered by tape media. Unfortunately, backup systems are typically unable to remove or delete individual files (such as files containing sensitive information) from tape media due to various inherent limitations of tape media.

For example, tape drivers typically store data on tape media in a sequential manner by writing a first file to the beginning of a new tape (potentially followed by an end-of-file (EOF) marker), a second file immediately after the first file (again potentially followed by an EOF marker), and so on until the end of the tape is reached. Conventional tape drivers also typically append each write to the tape with an end-of-data (EOD) marker in order to mark or identify where new writes to the tape should begin. Because EOD markers signify the end of data on a tape, any data located after an EOD marker on a tape will be inaccessible.

Unfortunately, because tape drivers typically append each write to a tape with an EOD marker, any attempt by a backup system to delete an individual file (by, e.g., replacing the file's contents with zeros) from a tape will, due to the EOD marker appended to end of the overwritten file, effectively render each file that is located after the overwritten file inaccessible. Thus, with the possible exception of the last file located on a tape, backup systems are typically unable to remove or delete individual files from a tape without inadvertently removing access to additional data and files on the tape. As such, the instant disclosure identifies a need for systems and methods for effectively removing access to individual files stored on tape media.

SUMMARY

As will be described in greater detail below, the instant disclosure generally relates to systems and methods for effectively removing access to individual files on magnetic tape media. In one example, the exemplary systems described herein may accomplish this task by: 1) encrypting a file to be stored on (or backed up to) a tape medium, 2) storing the encrypted file on the tape medium, 3) storing a cryptographic key for accessing (i.e., decrypting) the encrypted file within a cryptographic key block located at the end of the tape medium, and then, at a subsequent point in time, 4) removing access to the encrypted file by deleting the cryptographic key for the encrypted file from the cryptographic key block located at the end of the tape medium.

Prior to removing access to the encrypted file, the systems described herein may access the encrypted file by: 1) retrieving the cryptographic key for the encrypted file from the cryptographic key block located at the end of the tape medium, 2) using the cryptographic key to decrypt the encrypted file, and then 3) accessing the decrypted file. In some examples, the systems described herein may also enable existing backup systems to access the encrypted file by storing the cryptographic key within an external cryptographic key catalog. In these examples, the systems described herein may, upon deleting the cryptographic key from the cryptographic key block on the tape medium, prevent these backup systems from accessing the encrypted file by also deleting the cryptographic key from the external cryptographic key catalog.

In one example, the systems described herein may encrypt the file using a cryptographic key that is unique to the file. For example, the systems described herein may: 1) generate a hash of the file to be backed up to the tape medium, 2) use the hash of the file to generate a unique cryptographic key for the file, and then 3) encrypt the file using the unique cryptographic key. In other examples, the systems described herein may encrypt a plurality of files (such as a set of related files) using the same cryptographic key. In some examples, the cryptographic key may represent a symmetric cryptographic key.

In one example, the systems described herein may delete the cryptographic key for the encrypted file from the cryptographic key block on the tape medium by: 1) writing the cryptographic key block from the tape medium to a secondary medium (such as a hard disk drive), 2) modifying the cryptographic key block on the secondary medium by deleting the cryptographic key for the encrypted file from the cryptographic key block on the secondary medium, and then 3) writing the modified cryptographic key block from the secondary medium to the tape medium. In this example, the systems described herein may write the modified cryptographic key block from the secondary medium to the tape medium by overwriting the original cryptographic key block located at the end of the tape medium with the modified cryptographic key block from the secondary medium.

As will be described in greater detail below, by deleting cryptographic keys for encrypted files stored on tape media, the systems and methods described herein may effectively remove access to these encrypted files without corrupting or otherwise rendering inaccessible additional data or files stored on such tape media. As such, the systems and methods described herein may enable backup systems to quickly and effectively remove access to individual files (such as files containing sensitive information) stored on tape media.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
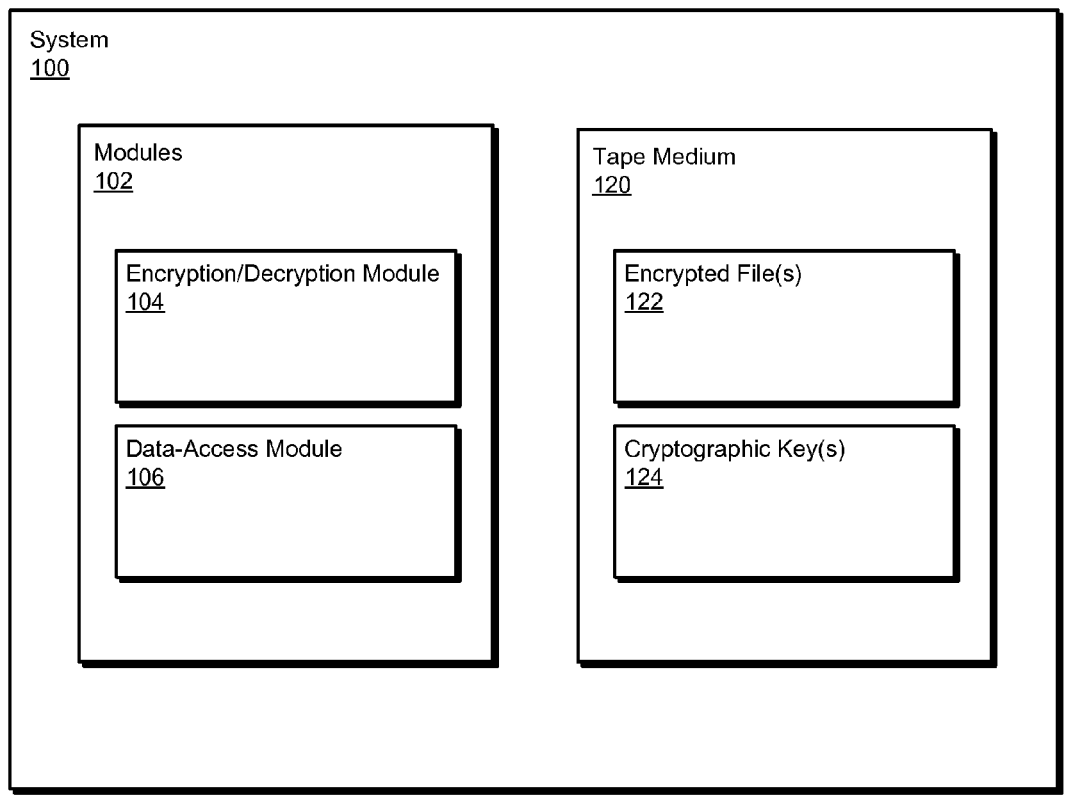
FIG. 1 is a block diagram of an exemplary system for effectively removing access to individual files on magnetic tape media.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for effectively removing access to individual files on magnetic tape media. The following will provide, with reference to FIGS. 1-2, detailed descriptions of exemplary systems for performing such a task. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for effectively removing access to individual files on magnetic tape media, As illustrated in this figure, exemplary system 100 may include one or more modules 102 for performing one or more tasks. For example, and as will be explained in greater detail below, exemplary system 100 may include an encryption/decryption module 104 programmed to encrypt files to be stored on, or backed up to, a tape medium. Exemplary system 100 may also include a data-access module 106 programmed to effectively remove access to these encrypted files by deleting cryptographic keys for accessing the encrypted files from a cryptographic key block located at the end of the tape medium. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., backup system 202), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include a tape medium 120. As will be described in greater detail below, in one example tape medium 120 may include one or more encrypted files 122 and one or more cryptographic keys 124 for accessing encrypted files 122.

Tape medium 120 may represent portions of a single computing device or a plurality of computing devices. For example, tape medium 120 may represent a portion of backup system 202 in FIG. 2, computing system 610 in FIG. 6, and/or portions of exemplary network architecture 700 in FIG. 7. Alternatively, tape medium 120 in FIG. 1 may represent one or more physically separate media capable of being accessed by a computing device, such as backup system 202 in FIG. 2, computing system 610 in FIG. 6, and/or portions of exemplary network architecture 700 in FIG. 7.

Figure 2:
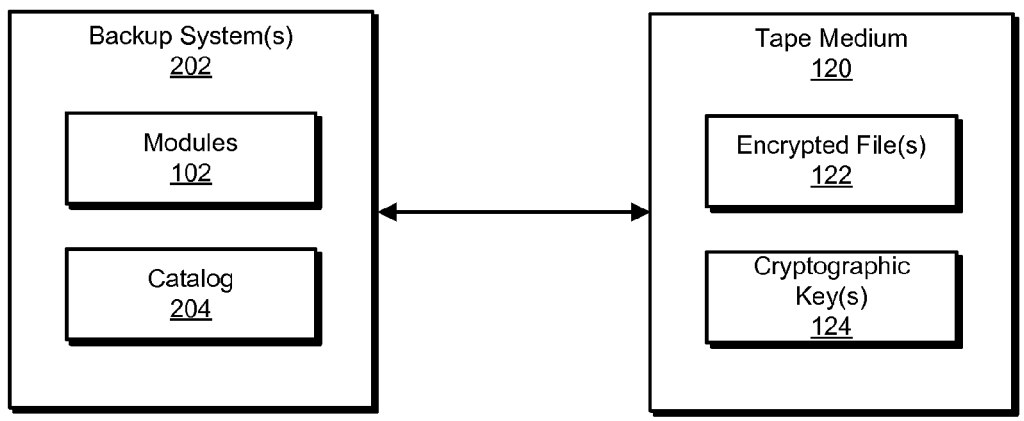
FIG. 2 is a block diagram of an exemplary system for effectively removing access to individual files on magnetic tape media.

Exemplary system 100 in FIG. 1 may be deployed in a variety of ways. For example, all or a portion of exemplary system 100 may represent portions of system 200 in FIG. 2. As shown in FIG. 2, system 200 may include a backup system 202 in communication with tape medium 120. Backup system 202 may be directly connected to tape medium 120 or connected via a network, such as an intranet, the Internet, or a storage area network (SAN).

In one embodiment, and as will be described in greater detail below, backup system 202 may be programmed to: 1) encrypt a file to be stored on or backed up to tape medium 120, 2) store the encrypted file on tape medium 120, 3) store a cryptographic key for accessing (i.e., decrypting) the encrypted file within a cryptographic key block located at the end of tape medium 120, and then 4) at a subsequent point in time, remove access to the encrypted file by deleting the cryptographic key for the encrypted file from the cryptographic key block located at the end of tape medium 120.

Backup system 202 generally represents any type or form of computing device capable of storing data on a tape medium. Examples of backup system 202 include, without limitation, laptops, desktops, servers (such as application, database, or SAN servers), cellular phones, personal digital assistants (PDAs), multimedia players, embedded systems, combinations of one or more of the same, exemplary computing system 610 in FIG. 6, or any other suitable computing device.

Figure 3:
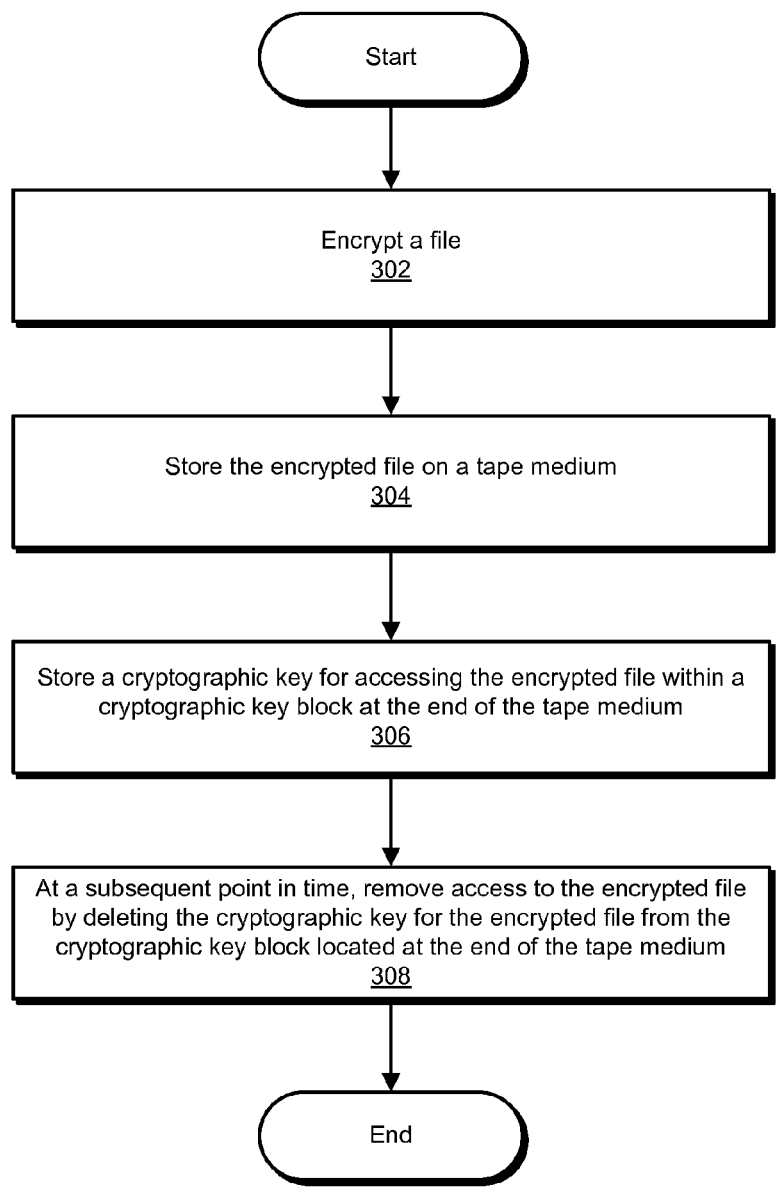
FIG. 3 is a flow diagram of an exemplary method for effectively removing access to individual files on magnetic tape media.

FIG. 3 is a flow diagram of an exemplary computer-implemented method 300 for effectively removing access to individual files on magnetic tape media. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may encrypt a file. For example, encryption/decryption module 104 in FIG. 1 may, as part of backup system 202 in FIG. 2, encrypt a file to be backed up or stored on tape medium 120.

The term "file," as used herein, may refer to any block of information or resource for storing computer-readable information. In one example, the file encrypted in step 302 may represent an encrypted file. That is, the file encrypted in step 302 may already have been encrypted, such that the encryption operation performed in step 302 may result in encrypting the encrypted file a second time.

Encryption/decryption module 104 may encrypt files in a variety of ways. For example, encryption/decryption module 104 may encrypt each file that is to be backed up or stored on tape medium 120 using a symmetric-key encryption algorithm, such as AES, RC4, TDES, CASTS, SERPENT, or the like. In this example, the cryptographic key used to encrypt the file may be identical to, or trivially related to, the cryptographic key required to decrypt the file.

In one example, encryption/decryption module 104 may encrypt each file to be backed up or stored on tape medium 120 using a unique cryptographic key. For example, encryption/decryption module 104 may generate a unique cryptographic key for each file to be backed up or stored on tape medium 120 by: 1) generating a hash of a file (e.g., at runtime) and then 2) using the hash of the file to generate a unique cryptographic key for the file.

Alternatively, encryption/decryption module 104 may encrypt more than one file using the same cryptographic key. For example, encryption/decryption module 104 may encrypt a set of files (e.g., a set of related files) using the same cryptographic key.

At step 304, the systems described herein may store the encrypted file on a tape medium. For example, data-access module 106 in FIG. 1 may, as part of backup system 202 in FIG. 2, store the file encrypted in step 302 on tape medium 120 in FIG. 2.

Figure 4:
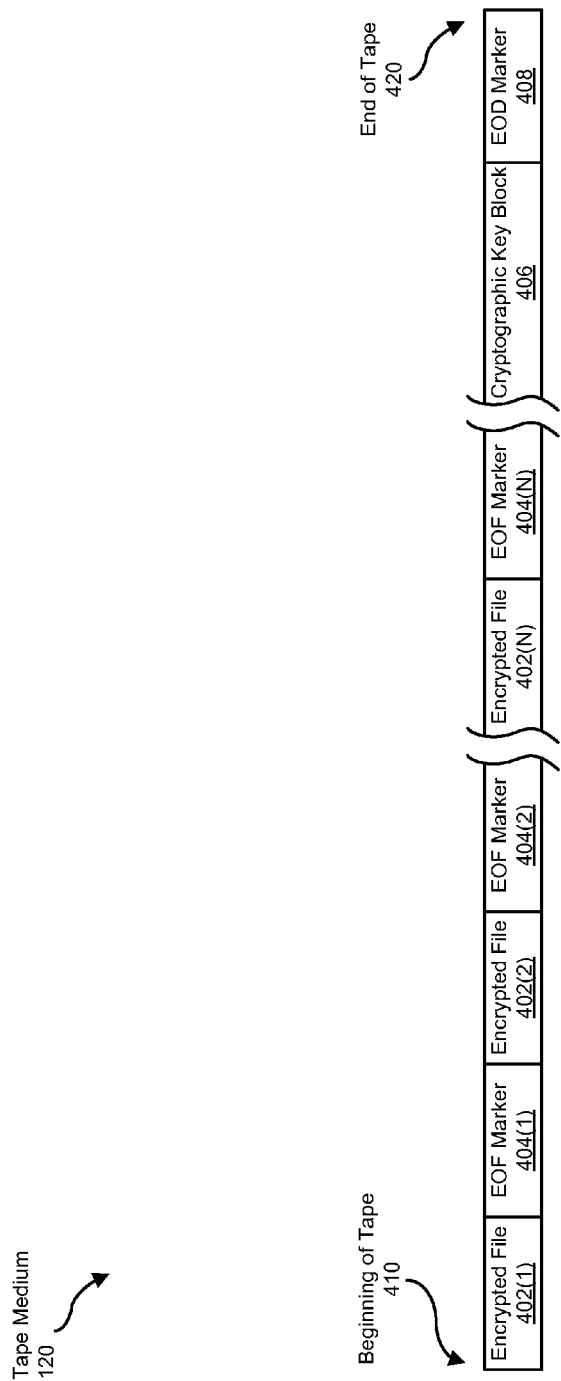
FIG. 4 is a block diagram of an exemplary tape medium containing a cryptographic key block located at the end of the tape medium that contains cryptographic keys for accessing encrypted files stored on the tape medium.

Data-access module 106 may store encrypted files on tape media in a variety of ways. In one example, data-access module 106 may store encrypted files on tape medium 120 in a sequential manner, with each encrypted file followed by an end-of-file (EOF) marker. In some examples, this EOF marker may be used to indicate the end of a file on a tape medium. For example, as illustrated in FIG. 4, data-access module 106 may store a first encrypted file 402(1) at the beginning 410 of tape medium 120. Data-access module 106 may then store an EOF marker 404(1) that corresponds to encrypted file 402(1) immediately after encrypted file 402(1) on tape medium 120. Data-access module 106 may then store a second encrypted file 402(2), along with its associated EOF marker 404(2), immediately after encrypted file 402(1) and its associated EOF marker 404(1). Data-access module 106 may then continue to store additional encrypted files, along with their associated EOF markers, sequentially in this manner.

Returning to FIG. 3, at step 306 the systems described herein may store a cryptographic key for accessing the encrypted file within a cryptographic key block at the end of the tape medium. For example, data-access module 106 in FIG. 1 may, as part of backup system 202 in FIG. 2, store a cryptographic key for accessing encrypted file 402(1) within a cryptographic key block 406 stored proximate to the end 420 of tape medium 120 in FIG. 4.

Figure 5:
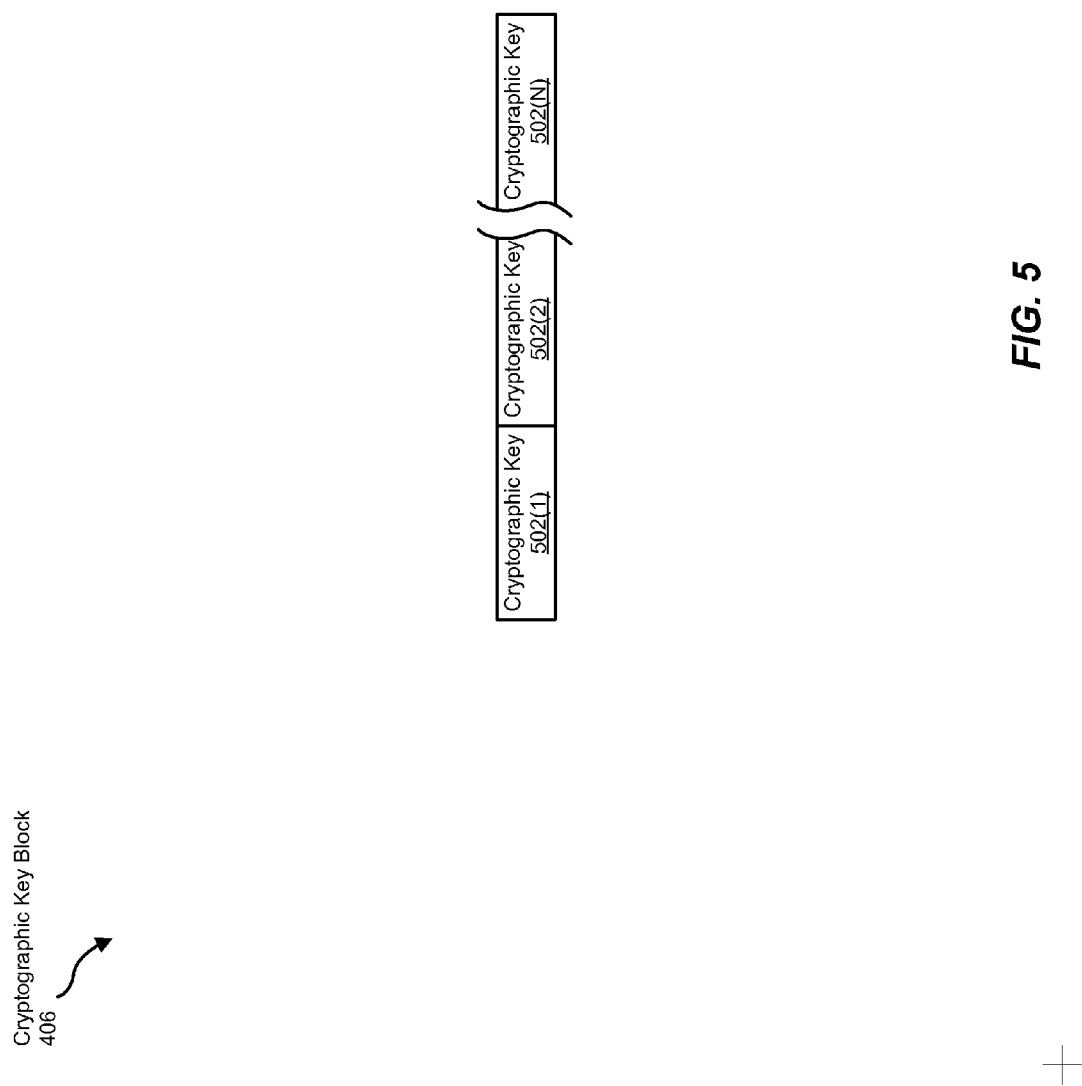
FIG. 5 is a block diagram of an exemplary cryptographic key block for storing cryptographic keys for accessing encrypted files stored on a tape medium.

As illustrated in FIG. 4, cryptographic key block 406 may be stored on tape medium 120 immediately prior to an end-of-data (EOD) marker 408 stored at the end 420 of tape medium 120. In this example, EOD marker 408 may represent a marker or flag for identifying the end of data stored on a tape medium. The term "cryptographic key block," as used herein, may refer to any block of data that may contain cryptographic keys for accessing encrypted files stored on a tape medium. For example, as illustrated in FIG. 5, cryptographic key block 406 may include a cryptographic key for accessing each encrypted file stored on tape medium 120 in FIG. 4. In this example, cryptographic key block 406 may include a first cryptographic key 502(1) for accessing (i.e., decrypting) first encrypted file 402(1), a second cryptographic key 502(2) for accessing second encrypted file 402(2), and so on for each encrypted file stored on tape medium 120 in FIG. 4.

In some examples, a backup system (such as backup system 202 in FIG. 2) may later access an encrypted file (such as encrypted file 402(1)) stored on tape medium 120 in FIG. 4 by: 1) retrieving a cryptographic key for the encrypted file from the cryptographic key block located at the end of tape medium 120 (e.g., retrieving cryptographic key 502(1) for encrypted file 402(1) from cryptographic key block 406), 2) using the cryptographic key to decrypt the encrypted file (e.g., using cryptographic key 502(1) to decrypt encrypted file 402(1)), and then 3) accessing the decrypted file (e.g., accessing a decrypted version of encrypted file 402(1)).

In some examples, the systems described herein may enable one or more backup systems to access encrypted files stored on a tape medium by storing cryptographic keys for those encrypted files in an external cryptographic key catalog. For example, data-access module 106 in FIG. 1 may, upon storing cryptographic key 502(1) for encrypted file 402(1) within cryptographic key block 406 on tape medium 120 in FIG. 4, store cryptographic key 502(1) within catalog 204 on backup system 202 in FIG. 2. In this example, existing backup systems may access encrypted file 402(1) by: 1) retrieving cryptographic key 502(1) from catalog 204 in FIG. 2 and then 2) use cryptographic key 502(1) to decrypt encrypted file 402(1).

Returning to FIG. 3, at step 308 the systems described herein may, at some later point in time, remove access to the encrypted file stored on the tape medium in step 306 by deleting the cryptographic key for the encrypted file from the cryptographic key block located at the end of the tape medium. For example, data-access module 106 in FIG. 1 may, as part backup system 202 in FIG. 2, remove access to encrypted file 402(1) in FIG. 4 by deleting cryptographic key 502(1) from cryptographic key block 406 located proximate to the end 420 of tape medium 120 in FIG. 4.

Data-access module 106 may delete cryptographic keys for encrypted files from tape media in a variety of ways. In one example, data-access module 106 may delete cryptographic key 502(1) for encrypted file 402(1) from cryptographic key block 406 in FIG. 4 by: 1) writing cryptographic key block 406 from tape medium 120 to a secondary medium (such as a hard disk drive), 2) modifying cryptographic key block 406 on the secondary medium by deleting cryptographic key 502(1) for encrypted file 402(1) from cryptographic key block 406, and then 3) writing the modified version of cryptographic key block 406 (i.e., a version of cryptographic key block 406 from which cryptographic key 502(1) has been removed) from the secondary medium to tape medium 120. In this example, data-access module 106 may write the modified version of cryptographic key block 406 from the secondary medium to tape medium 120 by overwriting the original version of cryptographic key block 406 located at the end 420 of tape medium 120 with the modified version of cryptographic key block 406. Upon completion of step 308, exemplary method 300 in FIG. 3 may terminate.

As detailed above, in some examples data-access module 106 may store a cryptographic key for an encrypted file stored on a tape medium on an external cryptographic key catalog (such as catalog 204 in FIG. 2). In these examples, data-access module 106 may, upon deleting a cryptographic key from a cryptographic key block on a tape medium in step 308, delete a corresponding copy of this cryptographic key from the external cryptographic key catalog. For example, data-access module 106 may, upon deleting cryptographic key 502(1) from cryptographic key block 406 on tape medium 120 in FIG. 4, also delete a copy of cryptographic key 502(1) from catalog 204 in FIG. 2 in order to prevent backup systems from accessing encrypted file 402(1).

As detailed above, by deleting cryptographic keys for encrypted files stored on tape media, the systems and methods described herein may effectively remove access to these encrypted files without corrupting or otherwise rendering inaccessible additional data or files stored on such tape media. As such, the systems and methods described herein may enable backup systems to quickly and effectively remove access to individual files (such as files containing sensitive information) stored on tape media.

Figure 6:
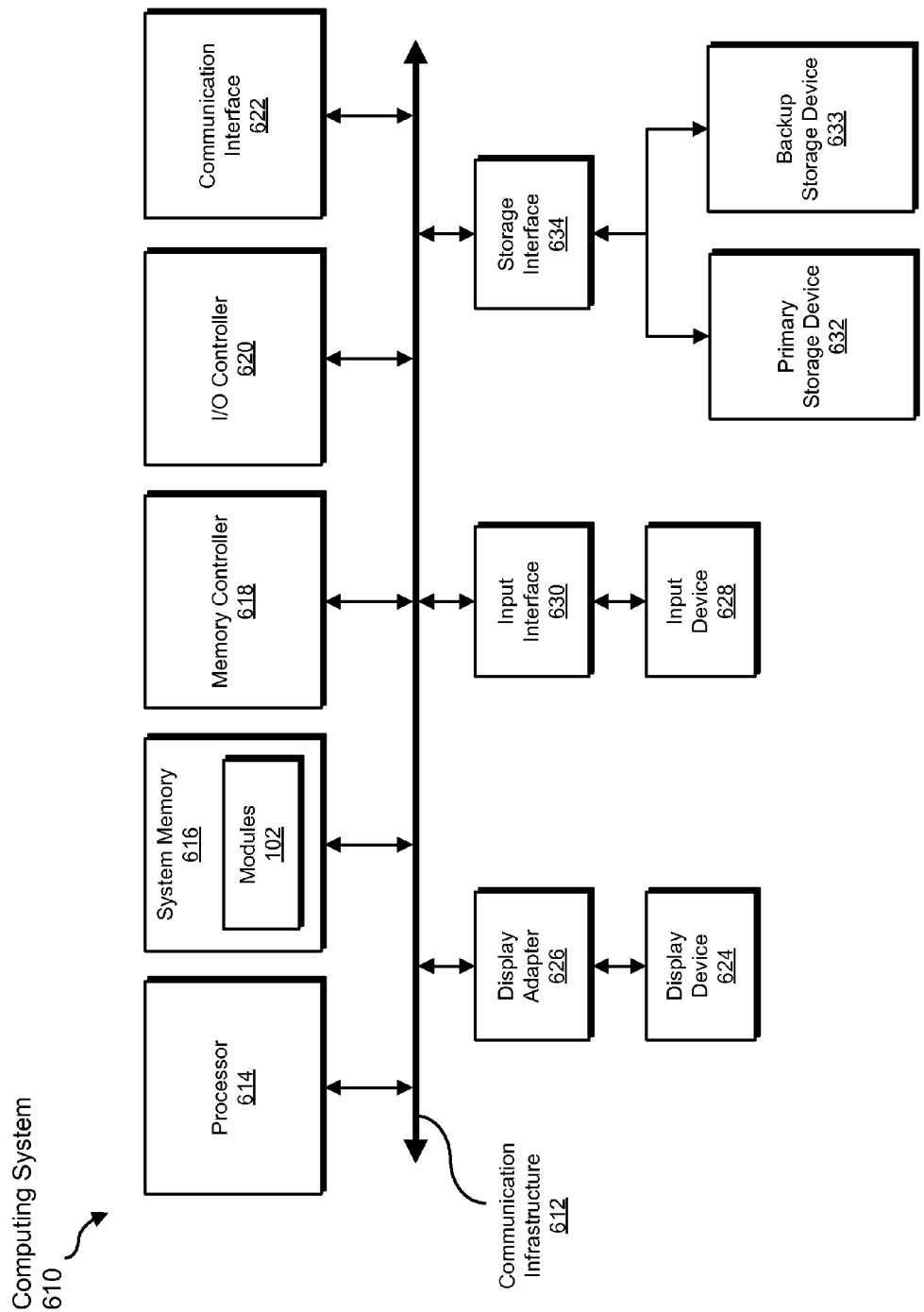
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the encrypting, storing, removing, deleting, retrieving, accessing, enabling, generating, writing, modifying, overwriting, and/or instructing steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as encrypting, storing, removing, deleting, retrieving, accessing, enabling, generating, writing, modifying, overwriting, and/or instructing.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the encrypting, storing, removing, deleting, retrieving, accessing, enabling, generating, writing, modifying, overwriting, and/or instructing steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the encrypting, storing, removing, deleting, retrieving, accessing, enabling, generating, writing, modifying, overwriting, and/or instructing steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the encrypting, storing, removing, deleting, retrieving, accessing, enabling, generating, writing, modifying, overwriting, and/or instructing steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the encrypting, storing, removing, deleting, retrieving, accessing, enabling, generating, writing, modifying, overwriting, and/or instructing steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
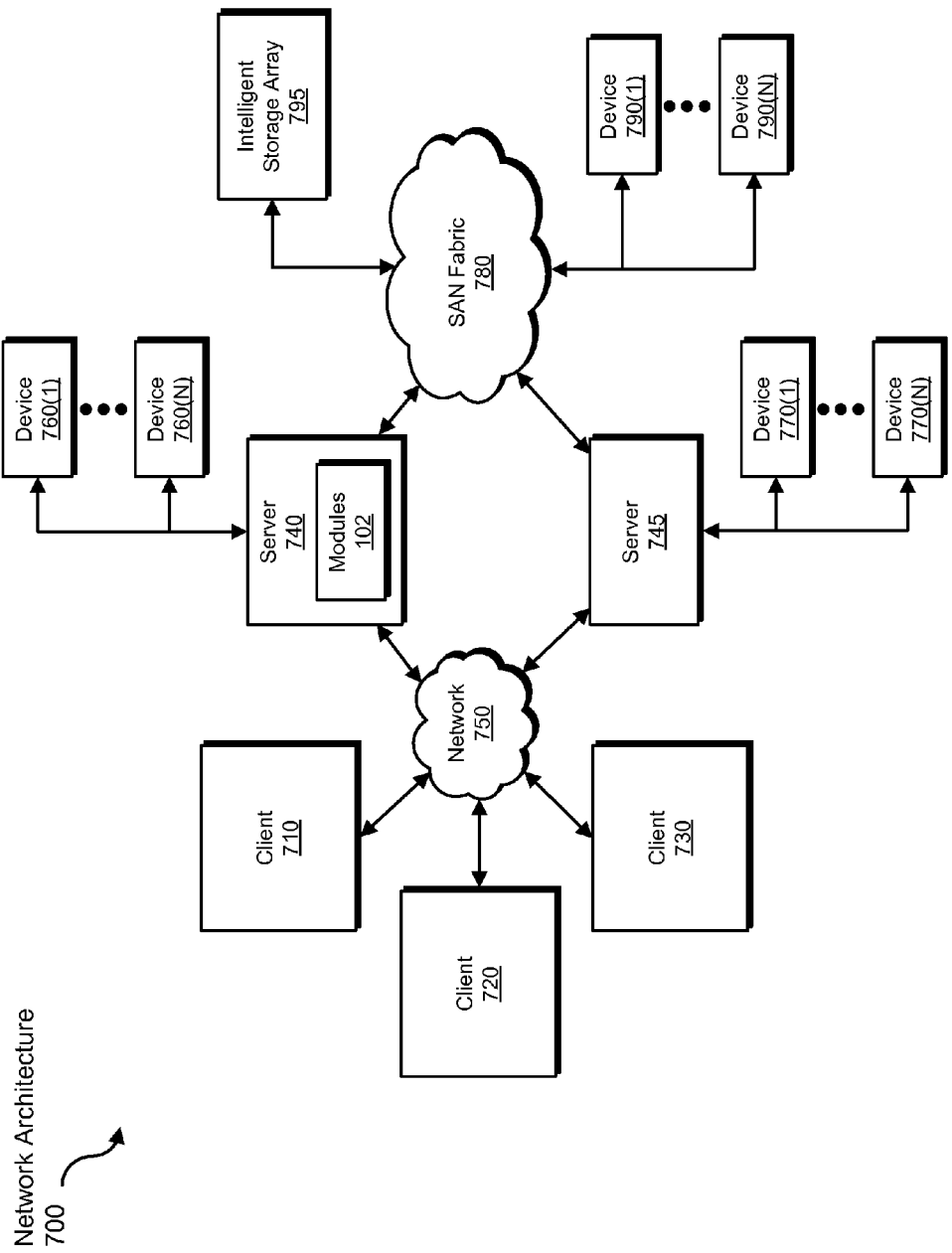
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include system 100 from FIG. 1. For example, server 740 may include modules 102 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a SAN fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the encrypting, storing, removing, deleting, retrieving, accessing, enabling, generating, writing, modifying, overwriting, and/or instructing steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for effectively removing access to individual files on magnetic tape media. In one example, such a method may include: 1) encrypting a file, 2) storing the encrypted file on a tape medium, 3) storing a cryptographic key for accessing the encrypted file within a cryptographic key block located at the end of the tape medium, and then, at a subsequent point in time, 4) removing access to the encrypted file by deleting the cryptographic key for the encrypted file from the cryptographic key block located at the end of the tape medium.

In some examples, the method may also include, prior to removing access to the encrypted file, accessing the encrypted file by: 1) retrieving the cryptographic key for the encrypted file from the cryptographic key block located at the end of the tape medium, 2) using the cryptographic key to decrypt the encrypted file, and then 3) accessing the decrypted file. In these examples, the method may also include enabling a backup system to access the encrypted file by storing the cryptographic key in an external cryptographic key catalog. The method may also include, upon deleting the cryptographic key from the cryptographic key block on the tape medium, deleting the cryptographic key from the external cryptographic key catalog.

In one example, encrypting the file may include: 1) generating a hash of the file, 2) using the hash of the file to generate a unique cryptographic key, and then 3) encrypting the file using the unique cryptographic key. Additionally or alternatively, the file may include a set of files and encrypting the file may include encrypting each file within the set of files using the same cryptographic key. In some examples, the cryptographic key may represent a symmetric cryptographic key.

In some examples, deleting the cryptographic key for the encrypted file from the cryptographic key block on the tape medium may include: 1) writing the cryptographic key block from the tape medium to a secondary medium, 2) modifying the cryptographic key block on the secondary medium by deleting the cryptographic key for the encrypted file from the cryptographic key block on the secondary medium, and then 3) writing the modified cryptographic key block from the secondary medium to the tape medium. In these examples, writing the modified cryptographic key block from the secondary medium to the tape medium may include overwriting the original cryptographic key block located at the end of the tape medium with the modified cryptographic key block.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In one example, all or a portion of the exemplary systems described herein may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the modules described herein may transform data, physical devices, and/or representations of physical devices from one form to another. For example, data-access module 106 in FIG. 1 may transform a property or characteristic of tape medium 120 by storing cryptographic keys for accessing encrypted files at the end of tape medium 120.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for effectively removing access to individual files on magnetic tape media, at least a portion of the method being performed by a computing device comprising at least one processor, the method comprising:
   encrypting both a file and at least one additional file;
   storing both the encrypted file and the additional encrypted file on a tape medium, wherein the additional encrypted file is stored in a physical location on the tape medium that immediately follows a physical location of the encrypted file on the tape medium;
   storing both a cryptographic key for accessing the encrypted file and an additional cryptographic key for accessing the additional encrypted file within a cryptographic key block located at the end of the tape medium;
   at a subsequent point in time, removing access to the encrypted file stored on the tape medium without also removing access to the additional encrypted file that is stored in the physical location on the tape medium that immediately follows the physical location of the encrypted file on the tape medium by:
      writing the cryptographic key block from the tape medium to a secondary medium;
      after writing the cryptographic key block from the tape medium to the secondary medium, creating a modified version of the cryptographic key block on the secondary medium by deleting the cryptographic key for the encrypted file from the cryptographic key block without also deleting the additional cryptographic key for the additional encrypted file from the cryptographic key block;
      after creating the modified version of the cryptographic key block on the secondary medium, writing the modified version of the cryptographic key block from the secondary medium to the end of the tape medium to overwrite the cryptographic key block located at the end of the tape medium with the modified version of the cryptographic key block.

2. The method of claim 1, further comprising, prior to removing access to the encrypted file, accessing the encrypted file by:
   retrieving the cryptographic key for the encrypted file from the cryptographic key block located at the end of the tape medium;
   using the cryptographic key to decrypt the encrypted file;
   accessing the decrypted file.

3. The method of claim 2, further comprising enabling a backup system to access the encrypted file by storing the cryptographic key in a cryptographic key catalog that is external to the tape medium.

4. The method of claim 3, further comprising, upon overwriting the cryptographic key block located at the end of the tape medium with the modified version of the cryptographic key block, deleting the cryptographic key from the cryptographic key catalog that is external to the tape medium.

5. The method of claim 1, wherein encrypting the file comprises:
   generating a hash of the file;
   using the hash of the file to generate a unique cryptographic key;
   encrypting the file using the unique cryptographic key.

6. The method of claim 1, wherein:
   the file comprises a set of files;
   encrypting the file comprises encrypting each file within the set of files using the cryptographic key.

7. The method of claim 1, wherein the cryptographic key comprises a symmetric cryptographic key.

8. A system for effectively removing access to individual files on magnetic tape media, the system comprising:
   an encryption/decryption module programmed to encrypt both a file and at least one additional file;
   a data-access module programmed to:
      store both the encrypted file and the additional encrypted file on a tape medium, wherein the additional encrypted file is stored in a physical location on the tape medium that immediately follows a physical location of the encrypted file on the tape medium;
      store both a cryptographic key for accessing the encrypted file and an additional cryptographic key for accessing the additional encrypted file within a cryptographic key block located at the end of the tape medium;
      at a subsequent point in time, remove access to the encrypted file stored on the tape medium without also removing access to the additional encrypted file that is stored in the physical location on the tape medium that immediately follows the physical location of the encrypted file on the tape medium by:
         writing the cryptographic key block from the tape medium to a secondary medium;
         after writing the cryptographic key block from the tape medium to the secondary medium, creating a modified version of the cryptographic key block on the secondary medium by deleting the cryptographic key for the encrypted file from the cryptographic key block without also deleting the additional cryptographic key for the additional encrypted file from the cryptographic key block;
         after creating the modified version of the cryptographic key block on the secondary medium, writing the modified version of the cryptographic key block from the secondary medium to the end of the tape medium to overwrite the cryptographic key block located at the end of the tape medium with the modified version of the cryptographic key block;
   at least one processor configured to execute the encryption/decryption module and the data-access module.

9. The system of claim 8, wherein the data-access module is further programmed to access the encrypted file prior to removing access to the encrypted file by:
   retrieving the cryptographic key for the encrypted file from the cryptographic key block located at the end of the tape medium;

instructing the encryption/decryption module to use the cryptographic key to decrypt the encrypted file;

accessing the decrypted file.

10. The system of claim 9, wherein the data-access module is further programmed to enable a backup system to access the encrypted file by storing the cryptographic key in a cryptographic key catalog that is external to the tape medium.

11. The system of claim 10, wherein the data-access module is further programmed to delete the cryptographic key from the cryptographic key catalog that is external to the tape medium upon overwriting the cryptographic key block located at the end of the tape medium with the modified version of the cryptographic key block.

12. The system of claim 8, wherein the encryption/decryption module encrypts the file by:

generating a hash of the file;

using the hash of the file to generate a unique cryptographic key;

encrypting the file using the unique cryptographic key.

13. The system of claim 8, wherein the file comprises a set of files and the encryption/decryption module encrypts the file by encrypting each file within the set of files using the cryptographic key.

14. The system of claim 8, wherein the cryptographic key comprises a symmetric cryptographic key.

15. A non-transitory computer-readable medium comprising computer-executable instructions that, when executed by at least one processor of a computing device, cause the computing device to:

encrypt both a file and at least one additional file;

store both the encrypted file and the additional encrypted file on a tape medium, wherein the additional encrypted file is stored in a physical location on the tape medium that immediately follows a physical location of the encrypted file on the tape medium;

store both a cryptographic key for accessing the encrypted file and an additional cryptographic key for accessing the additional encrypted file within a cryptographic key block located at the end of the tape medium;

at a subsequent point in time, remove access to the encrypted file stored on the tape medium without also removing access to the additional encrypted file that is stored in the physical location on the tape medium that immediately follows the physical location of the encrypted file on the tape medium by:

writing the cryptographic key block from the tape medium to a secondary medium;

after writing the cryptographic key block from the tape medium to the secondary medium, creating a modified version of the cryptographic key block on the secondary medium by deleting the cryptographic key for the encrypted file from the cryptographic key block without also deleting the additional cryptographic key for the additional encrypted file from the cryptographic key block;

after creating the modified version of the cryptographic key block on the secondary medium, writing the modified version of the cryptographic key block from the secondary medium to the end of the tape medium to overwrite the cryptographic key block located at the end of the tape medium with the modified version of the cryptographic key block.

16. The method of claim 1, wherein each write to the tape medium is appended with an end-of-data (EOD) marker that renders any data located on the tape medium after the EOD marker inaccessible.

* * * * *